(12) United States Patent
Gao et al.

(10) Patent No.: US 11,665,038 B2
(45) Date of Patent: May 30, 2023

(54) INFORMATION TRANSMISSION METHOD AND INFORMATION TRANSMISSION APPARATUS USING CYCLIC PREFIXES OF DIFFERENT LENGTHS IN FIRST AND SECOND TIME UNITS

(71) Applicant: Huawei Technologies Co., Ltd., Shenzhen (CN)

(72) Inventors: Lei Gao, Beijing (CN); Deping Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 17/088,181

(22) Filed: Nov. 3, 2020

(65) Prior Publication Data

US 2021/0075658 A1 Mar. 11, 2021

Related U.S. Application Data

(63) Continuation of application No. PCT/CN2019/083257, filed on Apr. 18, 2019.

(30) Foreign Application Priority Data

May 4, 2018 (CN) .......................... 201810420187.9

(51) Int. Cl.
*H04L 27/26* (2006.01)
*H04L 5/00* (2006.01)
(Continued)

(52) U.S. Cl.
CPC ........ *H04L 27/2607* (2013.01); *H04L 5/0048* (2013.01); *H04W 72/0446* (2013.01)

(58) Field of Classification Search
CPC . H04L 27/2607; H04L 5/0048; H04L 5/0053; H04L 5/0083; H04W 72/0446
See application file for complete search history.

(56) References Cited

U.S. PATENT DOCUMENTS

| | | | |
|---|---|---|---|
| 6,115,354 A | 9/2000 | Weck | |
| 2015/0195077 A1* | 7/2015 | Kim | ...................... H04L 5/0069 370/329 |

(Continued)

FOREIGN PATENT DOCUMENTS

| | | |
|---|---|---|
| CN | 101136892 A | 3/2008 |
| CN | 101778081 A | 7/2010 |

(Continued)

OTHER PUBLICATIONS

Huawei et al., "Evaluation on CP types for NR", 3GPP TSG RAN WG1 Meeting #86, R1-166100, Gothenburg, Sweden, Aug. 22-26, 2016, 9 pages.

(Continued)

*Primary Examiner* — Melvin C Marcelo
*Assistant Examiner* — Natali Pascual Peguero
(74) *Attorney, Agent, or Firm* — Slater Matsil, LLP

(57) ABSTRACT

A method includes: mapping, by a first terminal device, first information to a first time unit and a second time unit; and sending, by the first terminal device, the first information in the first time unit and the second time unit, where the first time unit includes a first symbol including a first cyclic prefix, the second time unit includes at least one second symbol including a second cyclic prefix, a length of the first cyclic prefix is greater than a length of the second cyclic prefix, and a length of the first time unit is equal to N times a length of the second symbol including the second cyclic prefix in the second time unit.

20 Claims, 3 Drawing Sheets

(51) Int. Cl.
*H04W 72/04* (2023.01)
*H04W 72/0446* (2023.01)

(56) References Cited

U.S. PATENT DOCUMENTS

| | | | |
|---|---|---|---|
| 2016/0135151 A1* | 5/2016 | Noh | H04L 5/0023 370/329 |
| 2016/0192396 A1* | 6/2016 | Ng | H04W 72/1289 370/329 |
| 2016/0227584 A1 | 8/2016 | Yanagisawa et al. | |
| 2017/0204511 A1 | 7/2017 | Rieschl et al. | |
| 2017/0215198 A1 | 7/2017 | Chen et al. | |
| 2018/0091267 A1 | 3/2018 | Kim et al. | |
| 2021/0152411 A1* | 5/2021 | Kuang | H04L 27/26025 |

FOREIGN PATENT DOCUMENTS

| | | |
|---|---|---|
| CN | 104770058 A | 7/2015 |
| CN | 104813600 A | 7/2015 |
| CN | 106507439 A | 3/2017 |
| CN | 106658697 A | 5/2017 |
| CN | 107113275 A | 8/2017 |
| CN | 107836129 A | 3/2018 |
| EP | 1698121 A1 | 9/2006 |
| WO | 2005064867 A1 | 7/2005 |
| WO | 2014025157 A1 | 2/2014 |
| WO | 2015042789 A1 | 4/2015 |
| WO | 2016192032 A1 | 12/2016 |

OTHER PUBLICATIONS

3rd Generation Partnership Project; Technical Specification Group Radio Access Network; NR; User Equipment (UE) radio transmission and reception; Part 1: Range 1 Standalone (Release 15), 3GPP TS 38.101-1 V15.1.0 (Mar. 2018), 71 pages.

3rd Generation Partnership Project; Technical Specification Group Radio Access Network; NR; User Equipment (UE) radio transmission and reception; Part 2: Range 2 Standalone (Release 15), 3GPP TS 38.101-2 V15.1.0 (Mar. 2018), 46 pages.

* cited by examiner

INFORMATION TRANSMISSION METHOD AND INFORMATION TRANSMISSION APPARATUS USING CYCLIC PREFIXES OF DIFFERENT LENGTHS IN FIRST AND SECOND TIME UNITS

CROSS-REFERENCE TO RELATED APPLICATIONS

This application is a continuation of International Application No. PCT/CN2019/083257, filed on Apr. 18, 2019, which claims priority to Chinese Patent Application No. 201810420187.9, filed on May 4, 2018. The disclosures of the aforementioned applications are hereby incorporated by reference in their entireties.

TECHNICAL FIELD

This application relates to the communications field, and in particular, to an information transmission method and an information transmission apparatus in the communications field.

BACKGROUND

In recent years, people pay increasing attention to an internet of vehicles technology. An internet of vehicles system improves road traffic safety and reliability and traffic efficiency through vehicle-to-vehicle communication, vehicle-to-transportation facility communication, and vehicle-to-pedestrian communication. The internet of vehicles system includes vehicle-to-vehicle (V2V) communication, vehicle-to-infrastructure (V2I) communication, vehicle-to-pedestrian (V2P) communication, vehicle-to-network (V2N) communication, and the like. To ensure safe driving of vehicles, terminal devices in the internet of vehicles system need to periodically exchange status information. Device-to-device (D2D) direct communication by using a resource allocated by a network or an autonomously selected resource is a manner of exchanging information between the internet of vehicles devices.

In a 5th generation mobile communications technology (5G), the internet of vehicles devices may perform device-to-device direct communication to support more types of services, such as a fleet service and a sensor information sharing service. These services impose a higher requirement on a coverage distance of the terminal device, and the coverage distance needs to reach 700 m or even 1000 m. In 5G, a higher-frequency carrier and larger bandwidth than those in a long term evolution (LTE) system need to be supported, and therefore, a larger subcarrier spacing (SCS) needs to be used. In this case, a length of a cyclic prefix (CP) is shortened. Therefore, how to ensure device-to-device direct communication, for example, V2V, V2I, or V2P direct communication, without changing a boundary position of a symbol used to decode data is a technical problem to be resolved urgently.

SUMMARY

This application provides an information transmission method and an information transmission apparatus, to ensure that a boundary position of a symbol used to decode data is not changed while device-to-device data transmission is ensured.

According to a first aspect, an information transmission method is provided. The method includes: mapping, by a first terminal device, first information to a first time unit and a second time unit; and sending, by the first terminal device, the first information in the first time unit and the second time unit, where the first time unit and the second time unit are consecutive, the first time unit is located before the second time unit, the first time unit includes a first symbol including a first cyclic prefix, the first symbol is the $1^{st}$ symbol used by the first terminal device to transmit the first information, the second time unit includes at least one second symbol including a second cyclic prefix, a length of the first cyclic prefix is greater than a length of the second cyclic prefix, a length of the first time unit is equal to N times a length of the second symbol including the second cyclic prefix in the second time unit, and N is an integer greater than or equal to 2.

In this embodiment of this application, the length of the first time unit is equal to N times the length of the second symbol including the second CP, the first symbol may be referred to as a special symbol, the first CP may be referred to as a special CP or a special long CP, the second symbol may be a common symbol defined in an existing protocol, and the second CP is a common CP (including an NCP and an ECP) defined in the existing protocol. In this way, the length of the first time unit is equal to an integer multiple of the length of the common symbol including the common CP. This can ensure that a boundary position of a symbol used to decode data is consistent with that specified in the existing protocol, to avoid further complexity. In this case, a transmitter and a receiver may partially reuse an existing design.

According to the information transmission method in this embodiment of this application, the $1^{st}$ symbol used in a data transmission includes the special cyclic prefix longer than the common cyclic prefix, and the length of the first time unit to which the $1^{st}$ symbol belongs is an integer multiple of the length of the common symbol including the common cyclic prefix. In this way, a boundary position of a symbol that is used to decode the data and that is in the second time unit is not changed while device-to-device data transmission is ensured.

It should be understood that a quantity of symbols included in the first time unit is not limited in this application. In other words, the first time unit may include another symbol in addition to the $1^{st}$ symbol (namely, the first symbol) used for transmission of the first information. Specifically, the another symbol included in the first time unit may also include the first cyclic prefix. When the first time unit includes one symbol, boundary positions of all symbols used to decode the data in the current data transmission are not changed while device-to-device data transmission is ensured.

In addition, the second terminal device used as a receive end may implement frequency synchronization by using a characteristic that a part that is in the first CP and that is not affected by automatic gain control AGC uses a same sequence as a part at the end of the first symbol.

In a possible design, the first information is a reference signal and/or data, and the mapping, by a first terminal device, first information to a first time unit and a second time unit includes: mapping, by the first terminal device, the reference signal to all or some resource elements in the first time unit.

Specifically, the reference signal may be mapped to all or some resources in the first symbol. In this way, because the first CP included in the first symbol is longer than the second CP included in the second symbol, when a receive timing offset is greater than the length of the second CP, the second terminal device may implement time synchronization by using the reference signal mapped to the first symbol.

In a possible design, the first time unit further includes a guard period, and the guard period is located at a start position of the first time unit.

The guard period may be used to prevent intersymbol interference ISI between signals sent by two different terminal devices in adjacent time units. Specifically, the different terminal devices separately send the signals in the adjacent time units, and timings at which the signals arrive at a receive terminal device are different. The second terminal device used as the receive end is used as an example. If a timing at which the second terminal device receives a previously transmitted signal is later than a timing at which the second terminal device receives a next transmitted signal, in time domain, the signals received by the second terminal device in the two transmissions partially overlap, and overlapping parts of the signals interfere with each other. Therefore, a time period (namely, the guard period GP) is reserved at a start position and/or an end position of each sending, and no information is sent in the time period. In this case, the two signals do not overlap.

Specifically, in this embodiment of this application, the GP may be located at a start position of a data transmission. Because at the beginning of each transmission, the first terminal device used as a transmit end needs to perform power adjustment, and the second terminal device used as the receive end needs to perform automatic gain control AGC, a time domain sequence whose length exceeds that of the second CP (namely, the common CP) usually cannot be identified by the second terminal device. Therefore, even if the data or the reference signal is mapped to the $1^{st}$ symbol at the beginning of the transmission, the $1^{st}$ symbol cannot be used for demodulation and decoding. The GP is placed at the beginning of the data transmission, so that a symbol that can be used by the second terminal device to decode the data is not wasted.

It should be understood that a position of the guard period is not limited in this application. In another possible implementation, the second time unit includes the guard period, and the guard period may be located at an end position of the second time unit. This is not limited in this embodiment of this application. It should be further understood that both the start position of the first time unit and the end position of the second time unit may include the guard period. The length of the guard period in the first time unit and the length of the guard period in the second time unit are not limited in this embodiment of this application.

In a possible design, a length of the guard period is agreed on in a protocol, configured by a network device, or preconfigured.

In a possible design, the length of the guard period is greater than a maximum timing offset, and the maximum timing offset is equal to twice a coverage distance supported by the first terminal device divided by a speed of light.

Specifically, the length of the GP may be designed to be different values corresponding to different design objectives of the coverage distance. This is not limited in this embodiment of this application. Generally, the length of the GP is greater than twice the coverage distance of the terminal device divided by the speed of light. For example, when the coverage distance is required to be 1000 m, the length of the GP is greater than 6.67 µs; when the coverage distance is required to be 700 m, the length of the GP is greater than 4.67 µs.

In a possible design, the length of the guard period is greater than a time period for the terminal device switching from a receive mode to a transmit mode and/or a time period for the terminal device switching from the transmit mode to the receive mode.

It should be understood that a receive/transmit switching time period of the terminal device includes the time period for the terminal device switching from the receive mode to the transmit mode and the time period for the terminal device switching from the transmit mode to the receive mode. When the length of the GP is greater than the receive/transmit switching time period of the terminal device, the terminal device can complete receive/transmit switching in the GP, to completely send and receive a corresponding signal.

In a possible design, the length of the guard period is greater than a sum of the maximum timing offset and the time period for the terminal device switching from the receive mode to the transmit mode; or the length of the guard period is greater than a sum of the maximum timing offset and the time period for the terminal device switching from the transmit mode to the receive mode, where the maximum timing offset is equal to twice the coverage distance supported by the first terminal device divided by the speed of light.

In a possible design, when the second cyclic prefix is configured as a normal cyclic prefix, when a subcarrier spacing is 15 kHz, the length of the guard period is equal to a length of the normal cyclic prefix, and the length of the first cyclic prefix is equal to a sum of the length of the normal cyclic prefix and a length of a part in the first symbol other than the first cyclic prefix; when a subcarrier spacing is 30 kHz, the length of the guard period is equal to twice a length of the normal cyclic prefix, and the length of the first cyclic prefix is equal to a length of a part in the first symbol other than the first cyclic prefix; or when a subcarrier spacing is 60 kHz, the length of the guard period is equal to four times a length of the normal cyclic prefix, and the length of the first cyclic prefix is equal to a length of a part in the first symbol other than the first cyclic prefix minus twice the length of the normal cyclic prefix.

In a possible design, the first time unit further includes a first sequence, the first sequence is located before the first cyclic prefix, and the first sequence is agreed on in the protocol, configured by the network device, or preconfigured.

Specifically, the first time unit further includes a sequence that is located before the first CP and that is used by the second terminal device to perform AGC power statistics collection. Optionally, the sequence may be a time-domain constant power sequence, a short-period sequence, or another type of sequence. This is not limited in this embodiment of this application. The time-domain constant power sequence is a sequence in which a complex number corresponding to each sampling point in time domain has a same modulus value, and the short-period sequence is a sequence whose period is shorter than the length of the first CP. The AGC may be divided into two phases: power statistics collection and gain adjustment. In the power statistics collection phase, average power of a received signal needs to be estimated. Therefore, using a specific sequence can increase a speed of estimating the average power by the second terminal device.

It should be understood that when the first time unit further includes the sequence, the first time unit sequentially includes the GP, the sequence, and the first CP.

In conclusion, according to the information transmission method in this embodiment of this application, the boundary position of the symbol used to decode the data may not be changed, the symbol that can be used by the terminal device on a receive side to decode the data is not wasted, and an ISI problem, a frequency synchronization problem, and a potential time synchronization problem between adjacent TTIs are resolved, so that system performance is improved.

According to a second aspect, another information transmission method is provided. The method includes: receiving, by a second terminal device, first information in a first time unit and a second time unit; and performing, by the second terminal device, demapping processing to obtain the first information, where the first time unit and the second time unit are consecutive, the first time unit is located before the second time unit, the first time unit includes a first symbol including a first cyclic prefix, the first symbol is the $1^{st}$ symbol used by the first terminal device to transmit the first information, the second time unit includes at least one second symbol including a second cyclic prefix, a length of the first cyclic prefix is greater than a length of the second cyclic prefix, a length of the first time unit is equal to N times a length of the second symbol including the second cyclic prefix in the second time unit, and N is an integer greater than or equal to 2.

In a possible design, the first time unit further includes a guard period, and the guard period is located at a start position of the first time unit.

In a possible design, a length of the guard period is agreed on in a protocol, configured by a network device, or preconfigured.

In a possible design, when the second cyclic prefix is configured as a normal cyclic prefix, when a subcarrier spacing is 15 kHz, the length of the guard period is equal to a length of the normal cyclic prefix, and the length of the first cyclic prefix is equal to a sum of the length of the normal cyclic prefix and a length of a part in the first symbol other than the first cyclic prefix; when a subcarrier spacing is 30 kHz, the length of the guard period is equal to twice a length of the normal cyclic prefix, and the length of the first cyclic prefix is equal to a length of a part in the first symbol other than the first cyclic prefix; or when a subcarrier spacing is 60 kHz, the length of the guard period is equal to four times a length of the normal cyclic prefix, and the length of the first cyclic prefix is equal to a length of a part in the first symbol other than the first cyclic prefix minus twice the length of the normal cyclic prefix.

In a possible design, the first time unit further includes a first sequence, the first sequence is located before the first cyclic prefix, and the first sequence is agreed on in the protocol, configured by the network device, or preconfigured.

According to a third aspect, an information transmission apparatus is provided, and is configured to perform the method in the first aspect or any possible implementation of the first aspect. Specifically, the apparatus includes units configured to perform the method in the first aspect or any possible implementation of the first aspect.

According to a fourth aspect, another information transmission apparatus is provided, and is configured to perform the method in the second aspect or any possible implementation of the second aspect. Specifically, the apparatus includes units configured to perform the method in the second aspect or any possible implementation of the second aspect.

According to a fifth aspect, another information transmission apparatus is provided. The terminal device includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method in the first aspect or any possible implementation of the first aspect.

According to a sixth aspect, another information transmission apparatus is provided. The terminal device includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method in the second aspect or any possible implementation of the second aspect.

According to a seventh aspect, a computer program product is provided. The computer program product includes computer program code. When the computer program code is run by a computing device, the computing device is enabled to perform the method in any possible implementation of the foregoing aspects.

According to an eighth aspect, a computer-readable medium is provided, and is configured to store a computer program. The computer program includes an instruction for performing the method in any possible implementation of the foregoing aspects.

According to a ninth aspect, a chip system is provided. The chip system includes a processor, configured to invoke a computer program from a memory and run the computer program, to enable an apparatus in which the chip system is installed to perform the method in any possible implementation of the foregoing aspects.

DETAILED DESCRIPTION OF ILLUSTRATIVE EMBODIMENTS

Technical solutions of embodiments of this application may be applied to various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, and a future 5G system.

Figure 1:
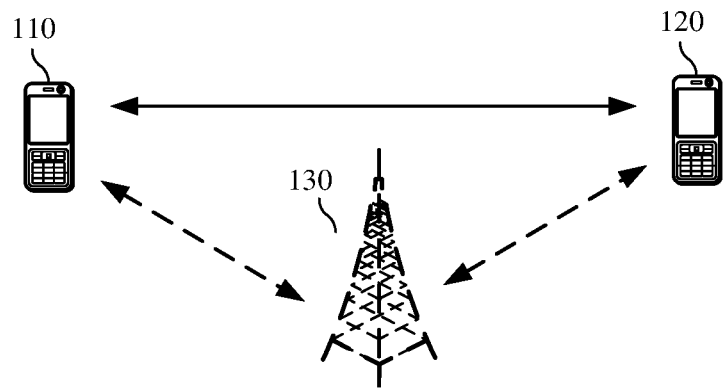
FIG. 1 is a schematic diagram of a communications system according to an embodiment of this application.

FIG. 1 shows a communications system 100 to which the embodiments of this application are applied. The communications system 100 may include a first terminal device 110 and a second terminal device 120. The first terminal device 110 and the second terminal device 120 may be mobile or fixed access terminals, user equipment (UE), subscriber units, subscriber stations, mobile stations, mobile stations, remote stations, remote terminals, mobile devices, user terminals, terminals, wireless communications devices, user agents, user apparatuses, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN).

The first terminal device 110 and the second terminal device 120 may perform direct communication with each other. It should be understood that the communications system 100 may be a D2D communications system. D2D communication is a technology that supports terminal devices in performing direct data communication with each other by using a dedicated air interface technology. D2D communication allows the terminal devices to directly communicate with each other by sharing a cell resource, so that a problem of lacking spectrum resources in the wireless communications system can be resolved. Optionally, the communications system 100 may be specifically a V2V communications system, a V2I communications system, a V2P communications system, or the like. This is not limited in the embodiments of this application.

Optionally, the communications system 100 may further include at least one network device 130. The at least one network device 130 may be a device that communicates with the first terminal device 110 and the second terminal device 120, for example, may be a base station or a base station controller. Each network device 130 may provide communication coverage for a particular geographical area, and may communicate with a terminal device (for example, UE) located in the coverage area (a cell). The at least one network device 130 may be a base transceiver station (BTS) in the GSM system or the code division multiple access (CDMA) system, a NodeB (NB) in the WCDMA system, an evolved NodeB (evolutional NodeB, eNB or eNodeB) in the LTE system, or a radio controller in a cloud radio access network (CRAN). Alternatively, the network device may be a relay station, an access point, a vehicle-mounted device, a wearable device, a network side device in the future 5G network, a network device in the future evolved public land mobile network (PLMN), or the like.

FIG. 1 shows an example in which there are one network device and two terminal devices. Optionally, the communications system 100 may include a plurality of network devices, and another quantity of terminal devices may be included in a coverage area of each network device. This is not limited in the embodiments of this application.

Optionally, the wireless communications system 100 may further include another network entity such as a network controller or a mobility management entity. This is not limited in the embodiments of this application.

For ease of understanding, the following first describes related terms in the embodiments of this application.

Intersymbol interference (ISI) problem: Using UE as an example, UE 1 and UE 3 are two sending UEs, and respectively send data to UE 2 at two adjacent transmission time intervals (TTI). Due to a timing difference between the UE 1 and the UE 3 and different transmission delays of the two transmissions, timings of the data in the two transmissions that is received by the UE 2 are different. As a result, a former TTI timing may be later than a latter TTI timing. In this case, it may be considered that there is ISI between the first symbol in the latter TTI and the last symbol in the former TTI.

Frequency synchronization problem: A V2X (for example, V2V, V2I, and V2P) communications system supports a relative speed of 500 km/h between terminal devices, and a carrier frequency is generally higher than that of uplink/downlink communication. Therefore, a frequency offset of a signal received by a terminal device is relatively high, and frequency synchronization needs to be performed.

Time synchronization problem (potential): A larger subcarrier spacing (subcarrier spacing, SCS) than that in a long term evolution (LTE) system may be used in 5G to obtain better link performance in a case of a larger Doppler spread and a frequency synchronization error. In this way, a cyclic prefix (CP) length is correspondingly shortened. Table 1 shows some combinations of the SCS and the CP length supported in a current standard. As shown in Table 1, in LTE, if the SCS is 15 kHz, a length of a normal cyclic prefix (NCP) is 4.7 µs. If the SCS is greater than 15 kHz, the length of the NCP is shortened. If the SCS is 60 kHz, a length of an extended cyclic prefix (ECP) is 4.2 µs. When the NCP is used, a length in the brackets is used for a CP of the $1^{st}$ symbol after a boundary of each time unit of 0.5 ms.

TABLE 1

| SCS (corresponding to a length of a symbol without a CP) | NCP length | ECP length |
| --- | --- | --- |
| 15 kHz (67 µs) | 4.7 µs (5.2 µs) | — |
| 30 kHz (33 µs) | 2.3 µs (2.9 µs) | — |
| 60 kHz (17 µs) | 1.2 µs (1.7 µs) | 4.2 µs |
| 120 kHz (8.3 µs) | 0.59 µs (1.1 µs) | — |
| 240 kHz (4.2 µs) | 0.29 µs (0.81 µs) | — |
| 480 kHz (2.1 µs) | 0.15 µs (0.67 µs) | — |

A coverage distance of a V2X communications system in 5G needs to reach 700 m or even 1000 m (a coverage distance of a V2X communications system in LTE needs to reach 320 m). As a result, a maximum receive timing offset increases. The receive timing offset and delay spread may be greater than the foregoing CP. In this case, a terminal device used as a receive end needs to perform time synchronization on each received signal, and then can correctly receive (including demodulation and decoding) the signal.

Figure 2:
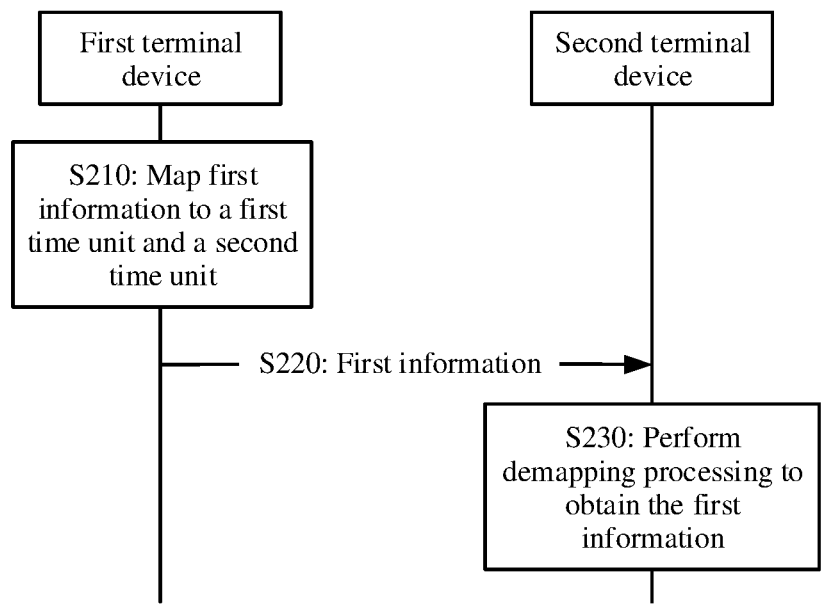
FIG. 2 is a schematic flowchart of an information transmission method according to an embodiment of this application.

FIG. 2 is a schematic flowchart 200 of an information transmission method according to an embodiment of this application. The method 200 may be applied to the communications system 100 shown in FIG. 1. However, this embodiment of this application is not limited thereto.

S210: A first terminal device maps first information to a first time unit and a second time unit.

S220: The first terminal device sends the first information in the first time unit and the second time unit, and correspondingly, a second terminal device receives the first information in the first time unit and the second time unit.

S230: The second terminal device performs demapping processing to obtain the first information.

The first time unit and the second time unit are consecutive, the first time unit is located before the second time unit, the first time unit includes a first symbol including a first cyclic prefix, the first symbol is the $1^{st}$ symbol used by the first terminal device to transmit the first information, the second time unit includes at least one second symbol including a second cyclic prefix, a length of the first cyclic prefix is greater than a length of the second cyclic prefix, a length of the first time unit is equal to N times a length of the second symbol including the second cyclic prefix in the second time unit, and N is an integer greater than or equal to 2.

Figure 3:
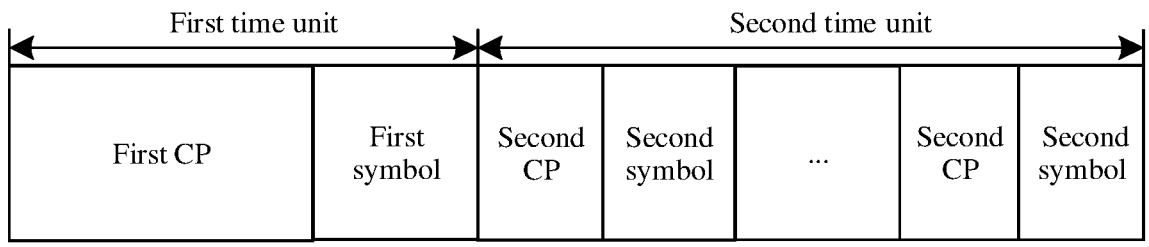
FIG. 3 is a schematic diagram of a physical layer structure used for information transmission according to an embodiment of this application.

Specifically, the first terminal device may map the first information to the first time unit and the second time unit, and send the first information to the second terminal device in the first time unit and the second time unit. FIG. 3 is a schematic diagram of a physical layer structure used for current data transmission performed between the first terminal device and the second terminal device. The first time unit and the second time unit are two consecutive time units, the first time unit is located before the second time unit, the first time unit includes the first symbol, the first symbol includes the first cyclic prefix (CP), the second time unit includes at least one second symbol, each of the at least one second symbol includes the second CP, and the length of the first CP is greater than the length of the second CP. It should be understood that the first symbol is the $1^{st}$ symbol in the physical layer structure used for the current data transmission, is located in the forefront of the physical layer structure, and the second symbol is another subsequent common symbol.

In this embodiment of this application, the length of the first time unit is equal to N times the length of the second symbol including the second CP, the first symbol may be referred to as a special symbol, the first CP may be referred to as a special CP or a special long CP, the second symbol may be a common symbol defined in an existing protocol, and the second CP is a common CP (including an NCP and an ECP) defined in the existing protocol. In this way, the length of the first time unit is equal to an integer multiple of the length of the common symbol including the common CP. This can ensure that a boundary position of a symbol used to decode data is consistent with that specified in the existing protocol, to avoid further complexity. In this case, a transmitter and a receiver may partially reuse an existing design.

According to the information transmission method in this embodiment of this application, the $1^{st}$ symbol used in a data transmission includes the special cyclic prefix longer than the common cyclic prefix, and the length of the first time unit to which the $1^{st}$ symbol belongs is an integer multiple of the length of the common symbol including the common cyclic prefix. In this way, a boundary position of a symbol that is used to decode the data and that is in the second time unit is not changed while device-to-device data transmission is ensured.

It should be understood that a quantity of symbols included in the first time unit is not limited in this application. In other words, the first time unit may include another symbol in addition to the $1^{st}$ symbol (namely, the first symbol) used for transmission of the first information. Specifically, the another symbol included in the first time unit may also include the first cyclic prefix. In this case, a length of the first cyclic prefix in each of a plurality of other symbols may be greater than the length of the second cyclic prefix in the second symbol. When the first time unit includes one symbol, boundary positions of all symbols used to decode the data in the current data transmission are not changed while device-to-device data transmission is ensured.

In addition, the second terminal device used as a receive end may implement frequency synchronization by using a characteristic that a part that is in the first CP and that is not affected by automatic gain control (AGC) uses a same sequence as a part at the end of the first symbol.

It should be understood that if the second symbol in the second time unit uses the ECP, the length of the first time unit is equal to N times the length of the second symbol including the ECP; or if the second symbol in the second time unit uses the NCP, the length of the first time unit is equal to N times the length of the second symbol including the NCP.

As shown in Table 1, a symbol including the NCP actually has two lengths. In the following, a symbol with a longer length is referred to as a longer symbol in symbols including the NCP, and a symbol with a shorter length is referred to as a shorter symbol in the symbols including the NCP. It should be noted that, in this embodiment of this application, when a boundary of a time unit of 0.5 ms is located at a position in the first time unit other than an end position, the length of the first time unit is equal to a sum of a length of the longer symbol in the symbols including the NCP and N−1 times a length of the shorter symbol in the symbols including the NCP; otherwise, the length of the first time unit is equal to N times the length of the shorter symbol in the symbols including the NCP.

In an optional embodiment, the first information is a reference signal and/or data, the data may include control signaling and/or service data, and that a first terminal device maps first information to a first time unit and a second time unit includes:

The first terminal device maps the reference signal to all or some resource elements in the first time unit.

Specifically, the reference signal may be mapped to all or some resources in the first symbol. In this way, because the first CP included in the first symbol is longer than the second CP included in the second symbol, when a receive timing offset is greater than the length of the second CP, the second terminal device may implement time synchronization by using the reference signal mapped to the first symbol.

In an optional embodiment, the first time unit further includes a guard period, and the guard period is located at a start position of the first time unit.

The guard period may be used to prevent intersymbol interference ISI between signals sent by two different terminal devices in adjacent time units. Specifically, the different terminal devices separately send the signals in the adjacent time units, and timings at which the signals arrive at a receive terminal device are different. The second terminal device used as the receive end is used as an example. If a timing at which the second terminal device receives a previously transmitted signal is later than a timing at which the second terminal device receives a next transmitted signal, in time domain, the signals received by the second terminal device in the two transmissions partially overlap, and overlapping parts of the signals interfere with each other. Therefore, a time period (namely, the guard period GP) is reserved at a start position and/or an end position of each sending, and no information is sent in the time period. In this case, the two signals do not overlap.

Specifically, in this embodiment of this application, the guard period (guard period, GP) may be located at a start position of a data transmission. If the GP is greater than a maximum timing offset on a dedicated sidelink carrier, an ISI problem between the adjacent TTIs can be resolved. Because at the beginning of each transmission, the first terminal device used as a transmit end needs to perform power adjustment, and the second terminal device used as the receive end needs to perform automatic gain control (AGC), a time domain sequence whose length exceeds that of the second CP (namely, the common CP) usually cannot be identified by the second terminal device.

Therefore, even if the data or the reference signal is mapped to the $1^{st}$ symbol at the beginning of the transmission, the $1^{st}$ symbol cannot be used for demodulation and decoding. The GP is placed at the beginning of the data transmission, so that a symbol that can be used by the second terminal device to decode the data is not wasted.

It should be understood that when the first time unit includes the GP, a sum of the length of the GP and the length of the first symbol is the length of the first time unit, in other words, the sum of the length of the GP and the length of the first symbol is equal to N times the length of the second symbol.

It should be further understood that a position of the guard period is not limited in this application. In another possible implementation, the second time unit includes the guard period, and the guard period may be located at an end position of the second time unit. This is not limited in this embodiment of this application. It should be further understood that both the start position of the first time unit and the end position of the second time unit may include the guard period. The length of the guard period in the first time unit and the length of the guard period in the second time unit are not limited in this embodiment of this application.

In an optional embodiment, the length of the guard period may be agreed on in a protocol, configured by a network device, or preconfigured.

In an optional embodiment, the length of the guard period is greater than the maximum timing offset, and the maximum timing offset is equal to twice a coverage distance supported by the first terminal device divided by a speed of light.

Specifically, the length of the GP may be designed to be different values corresponding to different design objectives of the coverage distance. This is not limited in this embodiment of this application. Generally, the length of the GP is greater than twice the coverage distance of the terminal device divided by the speed of light. For example, when the coverage distance is required to be 1000 m, the length of the GP is greater than 6.67 µs; when the coverage distance is required to be 700 m, the length of the GP is greater than 4.67 µs.

In an optional embodiment, the length of the guard period is greater than a time period for the terminal device switching from a receive mode to a transmit mode and/or a time period for the terminal device switching from the transmit mode to the receive mode.

It should be understood that a receive/transmit switching time period of the terminal device includes the time period for the terminal device switching from the receive mode to the transmit mode and the time period for the terminal device switching from the transmit mode to the receive mode. When the length of the GP is greater than the receive/transmit switching time period of the terminal device, the terminal device can complete receive/transmit switching in the GP, to completely send and receive a corresponding signal.

In an optional embodiment, the length of the guard period is greater than a sum of the maximum timing offset and the time period for the terminal device switching from the receive mode to the transmit mode; or the length of the guard period is greater than a sum of the maximum timing offset and the time period for the terminal device switching from the transmit mode to the receive mode, where the maximum timing offset is equal to twice the coverage distance supported by the first terminal device divided by the speed of light.

In an optional embodiment, when the second cyclic prefix is configured as a normal cyclic prefix, when a subcarrier spacing is 15 kHz, the length of the guard period is equal to a length of the normal cyclic prefix, and the length of the first cyclic prefix is equal to a sum of the length of the normal cyclic prefix and a length of a part in the first symbol other than the first cyclic prefix; when a subcarrier spacing is 30 kHz, the length of the guard period is equal to twice a length of the normal cyclic prefix, and the length of the first cyclic prefix is equal to a length of a part in the first symbol other than the first cyclic prefix; or when a subcarrier spacing is 60 kHz, the length of the guard period is equal to four times a length of the normal cyclic prefix, and the length of the first cyclic prefix is equal to a length of a part in the first symbol other than the first cyclic prefix minus twice the length of the normal cyclic prefix.

Specifically, if the coverage distance supported by the terminal device is 700 m, assuming that the length of the GP is greater than the receive/transmit switching time, when an SCS is different, the length of the GP and the length of the first CP may be implemented as any one of the following three cases:

(1) When SCS=15 kHz, GP=1*NCP, and first CP=first symbol−first CP+NCP;

(2) when SCS=30 kHz, GP=2*NCP, and first CP=first symbol−first CP; or (3) when SCS=60 kHz, GP=4*NCP, and first CP=first symbol−first CP−2*NCP.

In this way, it can be ensured that the length of the first time unit is twice the length of the second symbol including the second CP.

In an optional embodiment, the first time unit further includes a first sequence, the first sequence is located before the first cyclic prefix, and the first sequence is agreed on in the protocol, configured by the network device, or preconfigured.

Specifically, the first time unit further includes a sequence that is located before the first CP and that is used by the second terminal device to perform AGC power statistics collection.

Optionally, the sequence may be a time-domain constant power sequence, a short-period sequence, or another type of sequence. This is not limited in this embodiment of this application. The time-domain constant power sequence is a sequence in which a complex number corresponding to each sampling point in time domain has a same modulus value, and the short-period sequence is a sequence whose period is shorter than the length of the first CP. The AGC may be divided into two phases: power statistics collection and gain adjustment. In the power statistics collection phase, average power of a received signal needs to be estimated. Therefore, using a specific sequence can increase a speed of estimating the average power by the second terminal device.

It should be understood that when the first time unit further includes the sequence, the first time unit sequentially includes the GP, the sequence, and the first CP. A sum of the length of the GP and the length of the first symbol (including the sequence and the first CP) is the length of the first time unit, in other words, the sum of the length of the GP and the length of the first symbol is equal to N times the length of the second symbol.

In conclusion, according to the information transmission method in this embodiment of this application, the boundary position of the symbol used to decode the data may not be changed, the symbol that can be used by the terminal device on a receive side to decode the data is not wasted, and an ISI problem, a frequency synchronization problem, and a potential time synchronization problem between adjacent TTIs are resolved, so that system performance is improved.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

The information transmission method according to the embodiments of this application is described in detail above with reference to FIG. 1 to FIG. 3, and information transmission apparatuses according to the embodiments of this application are described in detail below with reference to FIG. 4 to FIG. 7.

Figure 4:
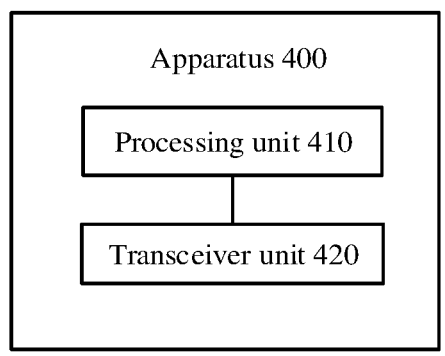
FIG. 4 is a schematic block diagram of an information transmission apparatus according to an embodiment of this application.

FIG. 4 shows an information transmission apparatus 400 according to an embodiment of this application. The apparatus 400 includes: a processing unit 410, configured to map first information to a first time unit and a second time unit; and a transceiver unit 420, configured to send the first information in the first time unit and the second time unit, where the first time unit and the second time unit are consecutive, the first time unit is located before the second time unit, the first time unit includes a first symbol including a first cyclic prefix, the first symbol is the $1^{st}$ symbol used by the apparatus to transmit the first information, the second time unit includes at least one second symbol including a second cyclic prefix, a length of the first cyclic prefix is greater than a length of the second cyclic prefix, a length of the first time unit is equal to N times a length of the second symbol including the second cyclic prefix in the second time unit, and N is an integer greater than or equal to 2.

According to the information transmission apparatus in this embodiment of this application, the $1^{st}$ symbol used in a data transmission includes a special cyclic prefix longer than a common cyclic prefix, and the length of the first time unit to which the $1^{st}$ symbol belongs is an integer multiple of a length of a common symbol including a common cyclic prefix. In this way, a boundary position of a symbol that is used to decode data and that is in the second time unit is not changed while device-to-device data transmission is ensured.

Optionally, the first information is a reference signal and/or data, and the processing unit 410 is specifically configured to map the reference signal to all or some resource elements in the first time unit.

Optionally, the first time unit further includes a guard period, and the guard period is located at a start position of the first time unit.

Optionally, a length of the guard period is agreed on in a protocol, configured by a network device, or preconfigured.

Optionally, when the second cyclic prefix is configured as a normal cyclic prefix, when a subcarrier spacing is 15 kHz, the length of the guard period is equal to a length of the normal cyclic prefix, and the length of the first cyclic prefix is equal to a sum of the length of the normal cyclic prefix and a length of a part in the first symbol other than the first cyclic prefix; when a subcarrier spacing is 30 kHz, the length of the guard period is equal to twice a length of the normal cyclic prefix, and the length of the first cyclic prefix is equal to a length of a part in the first symbol other than the first cyclic prefix; or when a subcarrier spacing is 60 kHz, the length of the guard period is equal to four times a length of the normal cyclic prefix, and the length of the first cyclic prefix is equal to a length of a part in the first symbol other than the first cyclic prefix minus twice the length of the normal cyclic prefix.

Optionally, the first time unit further includes a first sequence, the first sequence is located before the first cyclic prefix, and the first sequence is agreed on in the protocol, configured by the network device, or preconfigured.

It should be understood that, the apparatus 400 herein is presented in a form of function units. The term "unit" herein may refer to an application-specific integrated circuit (application specific integrated circuit, ASIC), an electronic circuit, a processor (for example, a shared processor, a dedicated processor, or a group processor) configured to execute one or more software or firmware programs, a memory, a merge logic circuit, and/or another suitable component that supports the described function. In an optional example, a person skilled in the art may understand that, the apparatus 400 may be specifically the first terminal device in the foregoing embodiment, and the apparatus 400 may be configured to perform procedures and/or steps corresponding to the first terminal device in the foregoing method embodiment. To avoid repetition, details are not described herein again.

The apparatus 400 has a function for implementing the corresponding steps performed by the first terminal device in the foregoing method. The function may be implemented by hardware, or may be implemented by hardware executing corresponding software. The hardware or the software includes one or more modules corresponding to the foregoing function. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In this embodiment of this application, the apparatus in FIG. 4 may alternatively be a chip or a chip system, for example, a system-on-a-chip (SoC). Correspondingly, the transceiver unit may be a transceiver circuit of the chip. This is not limited in this embodiment of this application.

Figure 5:
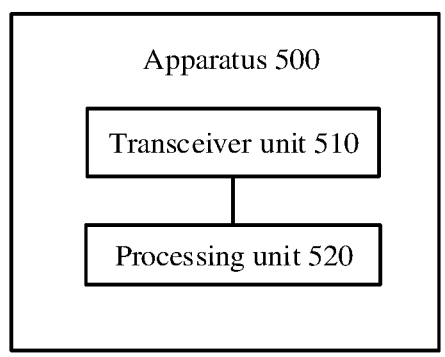
FIG. 5 is a schematic block diagram of another information transmission apparatus according to an embodiment of this application.

FIG. 5 shows an information transmission apparatus 500 according to an embodiment of this application. The apparatus 500 includes: a transceiver unit 510, configured to receive first information in a first time unit and a second time unit; and a processing unit 520, configured to perform demapping processing to obtain the first information, where the first time unit and the second time unit are consecutive, the first time unit is located before the second time unit, the first time unit includes a first symbol including a first cyclic prefix, the first symbol is the $1^{st}$ symbol used by the first terminal device to transmit the first information, the second time unit includes at least one second symbol including a second cyclic prefix, a length of the first cyclic prefix is greater than a length of the second cyclic prefix, a length of the first time unit is equal to N times a length of the second symbol including the second cyclic prefix in the second time unit, and N is an integer greater than or equal to 2.

According to the information transmission apparatus in this embodiment of this application, the $1^{st}$ symbol used in a data transmission includes a special cyclic prefix longer than a common cyclic prefix, and the length of the first time unit to which the $1^{st}$ symbol belongs is an integer multiple of a length of a common symbol including a common cyclic prefix. In this way, a boundary position of a symbol that is used to decode data and that is in the second time unit is not changed while device-to-device data transmission is ensured.

Optionally, the first time unit further includes a guard period, and the guard period is located at a start position of the first time unit.

Optionally, a length of the guard period is agreed on in a protocol, configured by a network device, or preconfigured.

Optionally, when the second cyclic prefix is configured as a normal cyclic prefix, when a subcarrier spacing is 15 kHz, the length of the guard period is equal to a length of the normal cyclic prefix, and the length of the first cyclic prefix is equal to a sum of the length of the normal cyclic prefix and a length of a part in the first symbol other than the first cyclic prefix; when a subcarrier spacing is 30 kHz, the length of the guard period is equal to twice a length of the normal cyclic prefix, and the length of the first cyclic prefix is equal to a length of a part in the first symbol other than the first cyclic prefix; or when a subcarrier spacing is 60 kHz, the length of the guard period is equal to four times a length of the normal cyclic prefix, and the length of the first cyclic prefix is equal to a length of a part in the first symbol other than the first cyclic prefix minus twice the length of the normal cyclic prefix.

Optionally, the first time unit further includes a first sequence, the first sequence is located before the first cyclic prefix, and the first sequence is agreed on in the protocol, configured by the network device, or preconfigured.

It should be understood that, the apparatus 500 herein is presented in a form of function units. The term "unit" herein may refer to an application-specific integrated circuit (ASIC), an electronic circuit, a processor (for example, a shared processor, a dedicated processor, or a group processor) configured to execute one or more software or firmware programs, a memory, a merge logic circuit, and/or another suitable component that supports the described function. In an optional example, a person skilled in the art may understand that, the apparatus 500 may be specifically the second terminal device in the foregoing embodiment, and the apparatus 500 may be configured to perform procedures and/or steps corresponding to the second terminal device in the foregoing method embodiment. To avoid repetition, details are not described herein again.

The apparatus 500 has a function for implementing the corresponding steps performed by the second terminal device in the foregoing method. The function may be implemented by hardware, or may be implemented by hardware executing corresponding software. The hardware or the software includes one or more modules corresponding to the foregoing function. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In this embodiment of this application, the apparatus in FIG. 5 may alternatively be a chip or a chip system, for example, a system-on-a-chip (SoC). Correspondingly, the transceiver unit may be a transceiver circuit of the chip. This is not limited in this embodiment of this application.

Figure 6:
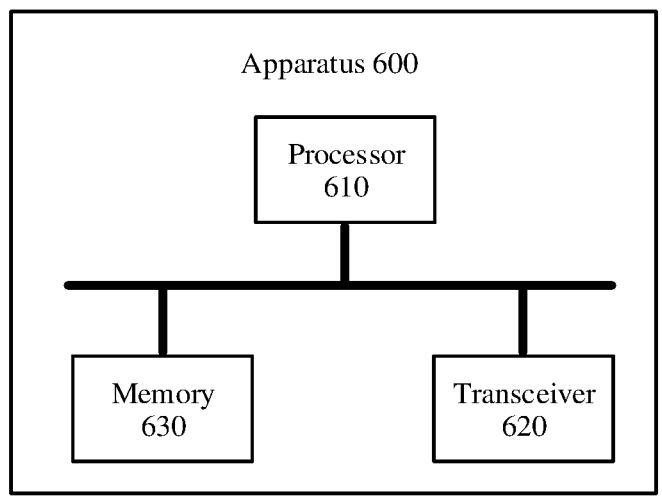
FIG. 6 is a schematic block diagram of another information transmission apparatus according to an embodiment of this application.

FIG. 6 shows another information transmission apparatus 600 according to an embodiment of this application. The apparatus 600 includes a processor 610, a transceiver 620, and a memory 630. The processor 610, the transceiver 620, and the memory 630 communicate with each other through an internal connection path, the memory 630 is configured to store an instruction, and the processor 610 is configured to execute the instruction stored in the memory 630, to control the transceiver 620 to send a signal and/or receive a signal.

The processor 610 is configured to: map first information to a first time unit and a second time unit; and send the first information in the first time unit and the second time unit through the transceiver 620, where the first time unit and the second time unit are consecutive, the first time unit is located before the second time unit, the first time unit includes a first symbol including a first cyclic prefix, the first symbol is the $1^{st}$ symbol used by the apparatus to transmit the first information, the second time unit includes at least one second symbol including a second cyclic prefix, a length of the first cyclic prefix is greater than a length of the second cyclic prefix, a length of the first time unit is equal to N times a length of the second symbol including the second cyclic prefix in the second time unit, and N is an integer greater than or equal to 2.

It should be understood that, the apparatus 600 may be specifically the first terminal device in the foregoing embodiment, and may be configured to perform steps and/or procedures corresponding to the first terminal device in the foregoing method embodiment. Optionally, the memory 630 may include a read-only memory and a random access memory, and provide an instruction and data for the processor. A part of the memory may further include a nonvolatile random access memory. For example, the memory may further store information of a device type. The processor 610 may be configured to execute the instruction stored in the memory, and when the processor 610 executes the instruction stored in the memory, the processor 610 is configured to perform the steps and/or procedures corresponding to the first terminal device in the method embodiment.

Optionally, the memory 630 may include a read-only memory and a random access memory, and provide an instruction and data for the processor. A part of the memory may further include a nonvolatile random access memory. For example, the memory may further store information of a device type. The processor 610 may be configured to execute the instruction stored in the memory, and when the processor 610 executes the instruction stored in the memory, the processor 610 is configured to perform the steps and/or procedures corresponding to the first terminal device in the method embodiment.

Figure 7:
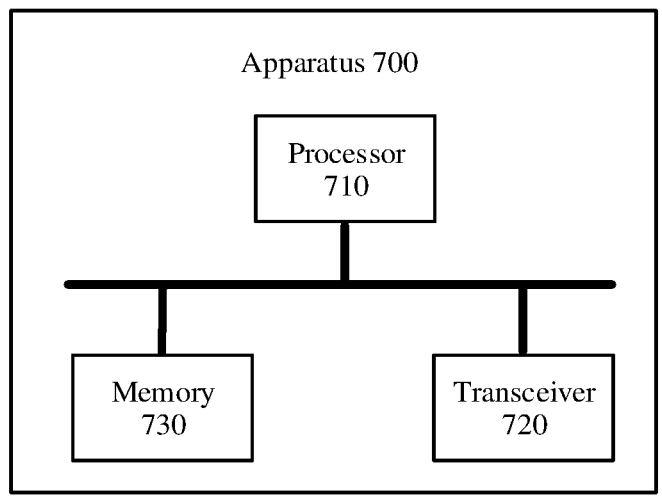
FIG. 7 is a schematic block diagram of another information transmission apparatus according to an embodiment of this application.

FIG. 7 shows another information transmission apparatus 700 according to an embodiment of this application. The apparatus 700 includes a processor 710, a transceiver 720, and a memory 730. The processor 710, the transceiver 720, and the memory 730 communicate with each other through an internal connection path, the memory 730 is configured to store an instruction, and the processor 710 is configured to execute the instruction stored in the memory 730, to control the transceiver 720 to send a signal and/or receive a signal.

The processor 710 is configured to: receive first information in a first time unit and a second time unit through the transceiver 720; and perform demapping processing to obtain the first information, where the first time unit and the second time unit are consecutive, the first time unit is located before the second time unit, the first time unit includes a first symbol including a first cyclic prefix, the first symbol is the $1^{st}$ symbol used by the first terminal device to transmit the first information, the second time unit includes at least one second symbol including a second cyclic prefix, a length of the first cyclic prefix is greater than a length of the second cyclic prefix, a length of the first time unit is equal to N times a length of the second symbol including the second cyclic prefix in the second time unit, and N is an integer greater than or equal to 2.

It should be understood that, the apparatus 700 may be specifically the second terminal device in the foregoing embodiment, and may be configured to perform steps and/or procedures corresponding to the second terminal device in the foregoing method embodiment. Optionally, the memory 730 may include a read-only memory and a random access memory, and provide an instruction and data for the processor. A part of the memory may further include a nonvolatile random access memory. For example, the memory may further store information of a device type. The processor 710 may be configured to execute the instruction stored in the memory, and when the processor 710 executes the instruction stored in the memory, the processor 710 is configured to perform the steps and/or procedures corresponding to the second terminal device in the method embodiment.

Optionally, the memory 730 may include a read-only memory and a random access memory, and provide an instruction and data for the processor. A part of the memory may further include a nonvolatile random access memory. For example, the memory may further store information of a device type. The processor 710 may be configured to execute the instruction stored in the memory, and when the processor 710 executes the instruction stored in the memory, the processor 710 is configured to perform the steps and/or procedures corresponding to the second terminal device in the method embodiment.

It should be understood that the transceiver may include a transmitter and a receiver. The transceiver may further include an antenna. There may be one or more antennas. The memory may be an independent device, or may be integrated into the processor. Each of the foregoing components or some components may be integrated into a chip for implementation, for example, integrated into a baseband chip for implementation.

In the embodiments of this application, the transceiver in FIG. 6 and FIG. 7 may alternatively be a communications interface. This is not limited herein.

It should also be understood that, in the embodiments of this application, the processor of the apparatus may be a central processing unit (central processing unit, CPU). The processor may alternatively be another general-purpose processor, a digital signal processor (digital signal processor, DSP), an application-specific integrated circuit (application specific integrated circuit, ASIC), a field-programmable gate array (field-programmable gate array, FPGA) or another programmable logic device, a discrete gate or a transistor logic device, or a discrete hardware component. The general-purpose processor may be a microprocessor, or the processor may be any conventional processor or the like.

In an implementation process, the steps in the foregoing method may be completed by using a hardware integrated logic circuit in the processor, or by using instructions in a form of software. The steps of the method disclosed with reference to the embodiments of this application may be directly performed by a hardware processor, or may be performed and completed by using the hardware in the processor and a software unit. The software unit may be located in a mature storage medium in the art, such as a random access memory, a flash memory, a read-only memory, a programmable read-only memory, an electrically erasable programmable memory, a register, or the like. The storage medium is located in the memory, and the processor reads instructions in the memory and completes the steps in the foregoing method in combination with the hardware of the processor. To avoid repetition, details are not described herein again.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

A person of ordinary skill in the art may be aware that, the method steps and units described with reference to the embodiments disclosed in this specification may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on a particular application and a design constraint condition of a technical solution. A person of ordinary skill in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and units, refer to a corresponding process in the method embodiment. Details are not described herein again.

In the several embodiments provided in this application, it should be understood that the disclosed system, apparatuses, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement figured out by a person skilled in the art within the technical scope disclosed in this application shall fall within the protection scope of this application. Therefore, the protection scope of this application shall be subject to the protection scope of the claims.

What is claimed is:

1. A method, comprising:
   mapping, by a first terminal device, first information to a first time unit and a second time unit; and
   sending, by the first terminal device, the first information mapped to the first time unit in the first time unit and the first information mapped to the second time unit in the second time unit, wherein the first time unit and the second time unit are consecutive, the first time unit is previous to the second time unit, the first time unit comprises a first symbol comprising a first cyclic prefix, the first symbol is a $1^{st}$ symbol used by the first terminal device to transmit the first information mapped to the first time unit, the second time unit comprises a second symbol comprising a second cyclic prefix, a length of the first cyclic prefix is greater than a length of the second cyclic prefix, the length of the first time unit is equal to N times a length of the second symbol comprising the second cyclic prefix in the second time unit, N is an integer greater than or equal to 2, the length of the first cyclic prefix is less than the length of the first symbol, and the length of the second cyclic prefix is less than the length of the second symbol.

2. The method according to claim 1, wherein the first information is a reference signal or data, and mapping, by the first terminal device, the first information to the first time unit and the second time unit comprises:
   mapping, by the first terminal device, the reference signal to all resource elements in the first time unit.

3. The method according to claim 1, wherein the first information is a reference signal or data, and mapping, by the first terminal device, the first information to the first time unit and the second time unit comprises:
   mapping, by the first terminal device, the reference signal to only a portion of resource elements in the first time unit.

4. The method according to claim 1, further comprising:
   receiving, by a second terminal device, the first information in the first time unit and the second time unit; and
   performing, by the second terminal device, demapping processing to obtain the first information.

5. The method according to claim 1, wherein the first time unit further comprises a guard period, and the guard period is located at a start position of the first time unit.

6. The method according to claim 5, wherein a length of the guard period is specified in a protocol, configured by a network device, or preconfigured.

7. The method according to claim 6, wherein the second cyclic prefix is configured as a normal cyclic prefix, and wherein:
   a subcarrier spacing is 15 kHz, the length of the guard period is equal to a length of the normal cyclic prefix, and the length of the first cyclic prefix is equal to a sum of the length of the normal cyclic prefix and a length of a part in the first symbol other than the first cyclic prefix;
   a subcarrier spacing is 30 kHz, the length of the guard period is equal to twice a length of the normal cyclic prefix, and the length of the first cyclic prefix is equal to a length of a part in the first symbol other than the first cyclic prefix; or
   a subcarrier spacing is 60 kHz, the length of the guard period is equal to four times a length of the normal cyclic prefix, and the length of the first cyclic prefix is equal to a length of a part in the first symbol other than the first cyclic prefix minus twice the length of the normal cyclic prefix.

8. The method according to claim 1, wherein the first time unit further comprises a first sequence, the first sequence is located before the first cyclic prefix, and the first sequence is specified in a protocol, configured by a network device, or preconfigured.

9. An apparatus, comprising:
   a transmitter;
   a processor; and
   a non-transitory computer-readable storage medium storing a program to be executed by the processor, the program including instructions for:
      mapping first information to a first time unit and a second time unit; and
      causing the transmitter to send the first information mapped to the first time unit in the first time unit and the first information mapped to the second time unit in the second time unit, wherein the first time unit and the second time unit are consecutive, the first time unit is previous to the second time unit, the first time unit comprises a first symbol comprising a first cyclic prefix, the first symbol is a $1^{st}$ symbol used by the apparatus to transmit the first information mapped to the first time unit, the second time unit comprises a second symbol comprising a second cyclic prefix, a length of the first cyclic prefix is greater than a length of the second cyclic prefix, a length of the first time unit is equal to N times a length of the second symbol comprising the second cyclic prefix in the second time unit, N is an integer greater than or equal to 2, the length of the first cyclic prefix is less than the length of the first symbol, and the length of the second cyclic prefix is less than the length of the second symbol.

10. The apparatus according to claim 9, wherein the first information is a reference signal, and the program includes instructions for:
mapping the reference signal to all or some resource elements in the first time unit.

11. The apparatus according to claim 9, wherein the first information is a reference signal or data, and the program includes instructions for:
mapping the reference signal to all or some resource elements in the first time unit.

12. The apparatus according to claim 9, wherein the first time unit further comprises a guard period, and the guard period is located at a start position of the first time unit.

13. The apparatus according to claim 12, wherein a length of the guard period is specified in a protocol, configured by a network device, or preconfigured.

14. The apparatus according to claim 12, wherein the second cyclic prefix is configured as a normal cyclic prefix, and wherein:
a subcarrier spacing is 15 kHz, the length of the guard period is equal to a length of the normal cyclic prefix, and the length of the first cyclic prefix is equal to a sum of the length of the normal cyclic prefix and a length of a part in the first symbol other than the first cyclic prefix;
a subcarrier spacing is 30 kHz, the length of the guard period is equal to twice a length of the normal cyclic prefix, and the length of the first cyclic prefix is equal to a length of a part in the first symbol other than the first cyclic prefix; or
a subcarrier spacing is 60 kHz, the length of the guard period is equal to four times a length of the normal cyclic prefix, and the length of the first cyclic prefix is equal to a length of a part in the first symbol other than the first cyclic prefix minus twice the length of the normal cyclic prefix.

15. The apparatus according to claim 9, wherein the first time unit further comprises a first sequence, the first sequence is located before the first cyclic prefix, and the first sequence is specified in a protocol, configured by a network device, or preconfigured.

16. An apparatus, comprising:
a transceiver;
a processor; and
a non-transitory computer-readable storage medium storing a program to be executed by the processor, the program including instructions for:
receiving, via the transceiver, first information in a first time unit and a second time unit; and
performing demapping processing to obtain the first information, wherein the first time unit and the second time unit are consecutive, the first time unit is previous to the second time unit, the first time unit comprises a first symbol comprising a first cyclic prefix, the first symbol is a $1^{st}$ symbol used by a transmitting device to transmit the first information, the second time unit comprises a second symbol comprising a second cyclic prefix, a length of the first cyclic prefix is greater than a length of the second cyclic prefix, a length of the first time unit is equal to N times a length of the second symbol comprising the second cyclic prefix in the second time unit, N is an integer greater than or equal to 2, the length of the first cyclic prefix is less than the length of the first symbol, and the length of the second cyclic prefix is less than the length of the second symbol.

17. The apparatus according to claim 16, wherein the first time unit further comprises a guard period, and the guard period is located at a start position of the first time unit.

18. The apparatus according to claim 17, wherein a length of the guard period is specified in a protocol.

19. The apparatus according to claim 17, wherein a length of the guard period is configured by a network device.

20. The apparatus according to claim 17, wherein a length of the guard period is preconfigured.

* * * * *